United States Patent [19]

White et al.

[11] 4,302,931
[45] Dec. 1, 1981

[54] FUEL FLOW LIMITING DEVICE FOR OVERSPEED AND OVERTEMPERATURE CONTROL

[75] Inventors: Albert H. White, Wethersfield; Raymond D. Zagranski, Newington, both of Conn.

[73] Assignee: Cnandler Evans Inc., West Hartford, Conn.

[21] Appl. No.: 160,006

[22] Filed: Jun. 16, 1980

[51] Int. Cl.³ ............................................... F02C 9/32
[52] U.S. Cl. ............................................... 60/39.28 R
[58] Field of Search .................................. 60/39.28 R

[56] References Cited

U.S. PATENT DOCUMENTS

| | | | |
|---|---|---|---|
| 3,139,893 | 7/1964 | Kuzmitz | 60/39.28 R |
| 3,232,053 | 2/1966 | Rogers et al. | 60/39.28 R |
| 3,374,622 | 3/1968 | Yates | 60/39.28 R |
| 3,488,946 | 1/1970 | Jubb et al. | 60/39.28 R |
| 3,771,314 | 11/1973 | Rose et al. | 60/39.28 R |
| 4,077,203 | 3/1978 | Burnell | 60/39.28 R |

Primary Examiner—Robert E. Garrett
Attorney, Agent, or Firm—Radford W. Luther; Richard A. Dornon

[57] ABSTRACT

A fuel control for a gas turbine engine has a fuel flow limiting valve located in series flow relationship with a main fuel metering valve, which is manually operable, to prevent engine overspeed and overtemperature conditions. A pulse-modulated solenoid valve, responsive to error signals indicative of engine overspeeds or overtemperature conditions, modulates the pressure in an actuation cylinder which positions the flow-limiting valve so that it limits flow in accordance with the magnitude of the error signals. The solenoid valve is pulsed by a redundant analog control so that, during manual operation of the main fuel metering valve, overspeed and overtemperature protection is provided to the engine. An indicator is furnished to apprise the operator of overspeed or overtemperature conditions.

4 Claims, 2 Drawing Figures

FUEL FLOW LIMITING DEVICE FOR OVERSPEED AND OVERTEMPERATURE CONTROL

BACKGROUND OF THE INVENTION

Prior art fuel controls for gas turbine engines have incorporated devices to enable an operator to manually position the main fuel metering valve in the event of a failure in the automatic metering valve positioning system. Such manual control devices are illustrated in U.S. Pat. Nos. 3,820,323 and 4,077,203. An inherent danger in employing such manual control devices is the possibility of overfueling the engine by overexhuberant operator responses whereby excessive engine temperatures and turbine speeds would be induced. While the likelihood of operator overfueling can be reduced by operator training in the manual control mode, it would nevertheless be highly desirable to provide for temperature and power turbine speed limiting during manual operation.

SUMMARY OF THE INVENTION

The invention provides for fuel flow limiting to prevent overspeeds and overtemperature conditions in not only normal fuel control operation but also in the manual control mode in which an operator positions a metering valve by means of a lever.

In accordance with the invention, a fuel flow limiting valve downstream of the main fuel metering valve in series flow relationship therewith, is positioned by an actuation cylinder. The pressure in the cylinder is modulated by a pulsed solenoid operated valve. Pulses are directed to the solenoid operated valve by appropriate circuitry which receives respective signals indicative of speed error and temperature error. The pulses, which have a duty cycle commensurate with the magnitude of the largest of the error signals, function to regulate the pressure in the actuation cylinder and hence the position of the flow limiting valve. The fuel pressures, which are communicated to the actuation cylinder, are high and low fuel pressures existing in the fuel control (e.g. the pressure upstream of the metering valve and boost pressure).

The control circuit, which supplies pulses to the solenoid, is preferably separate and distinct from the electronic computer which positions the metering valve in normal operation, whereby a complete and total computer failure will not in any way affect the operation of the flow limiting valve.

Accordingly, a primary object of the invention is to provide an electromechanical fuel control with a means to limit fuel flow during manual operation of the main fuel metering valve in order to forestall engine overtemperature and overspeed conditions.

This and other objects and advantages of the invention will become more readily apparent from the following detailed description, when taken in conjunction with the accompanying drawings, in which:

DETAILED DESCRIPTION OF PREFERRED EMBODIMENT

Figure 1:
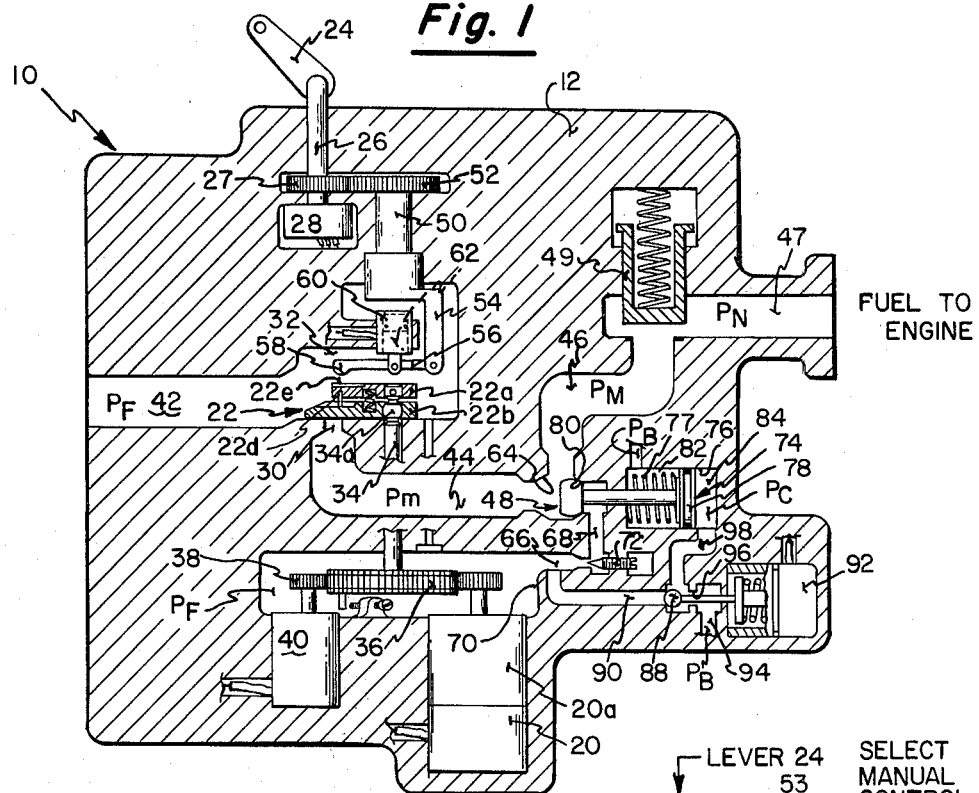
FIG. 1 is a fragmentary schematic diagram of a fuel control incorporating a fuel flow limiting device of the invention.
Figure 2:
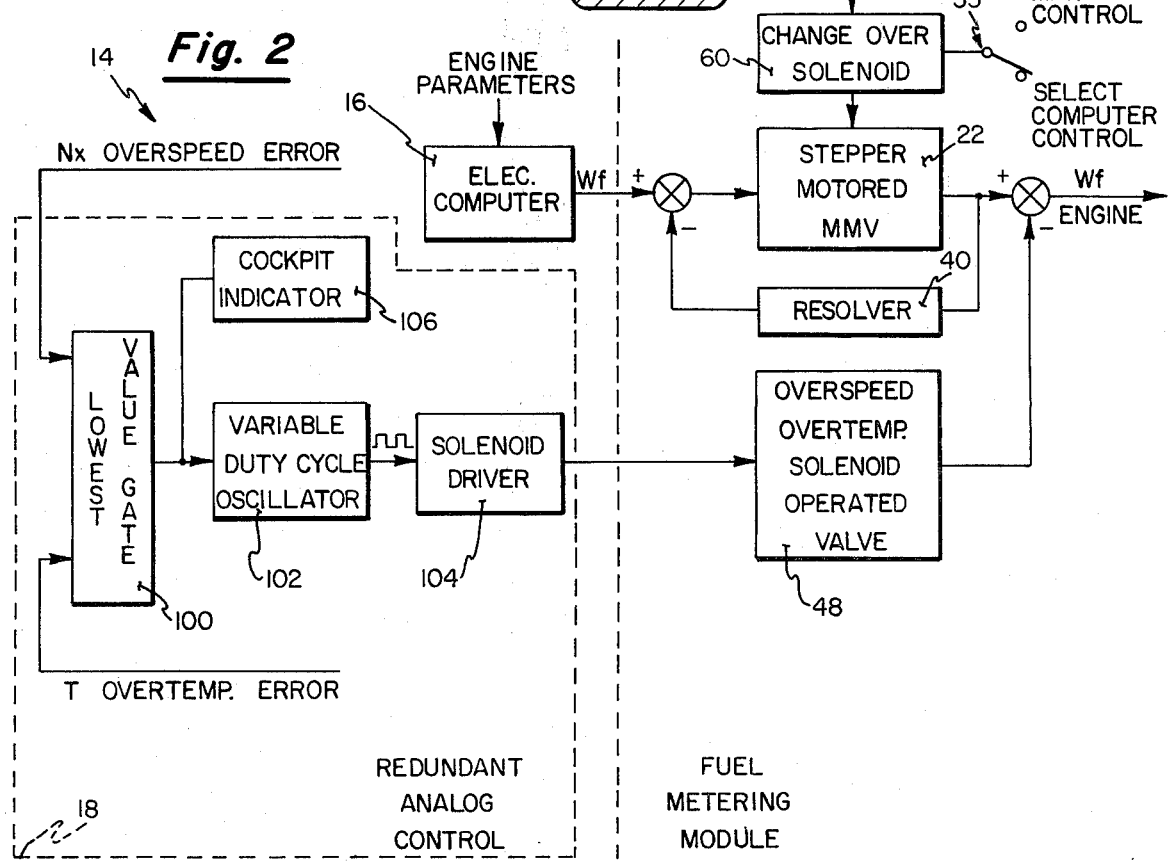
FIG. 2 is a block diagram of the fuel control of FIG. 1 together with the control circuit utilized to pulse the solenoid.

Referring to FIGS. 1 and 2, there is schematically shown a portion of a fuel control system which includes an embodiment of the invention. The fuel control basically incorporates a hydromechanical section, generally shown at 10, constituted by a plural cavity housing 12 and an electronic section, generally shown at 14, which comprises an electronic computer 16 (e.g., a microcomputer) and a redundant analog control circuit 18, not associated with the computer. In the particular embodiment illustrated, the computer 16 senses various engine parameters (e.g., temperature, compressor discharge pressure and engine speed) and applies a control signal to a stepping motor 20 which positions a metering valve, generally shown at 22.

A speed setting lever member 24 has a rotatable shaft 26 attached thereto which carries a gear 27 and has its end connected to a position transducer 28 (e.g., a potentiometer) which generates a set or requested speed signal to the computer 16.

The metering valve 22 is of the sliding plate variety depicted in U.S. Pat. No. 4,077,203, the angular position of which is determinative of the area of metering opening 30. The metering valve 22 slides over a wall of cavity 32 in which it is mounted when a shaft 34, in driving connection therewith, is turned via a gear train by the stepping motor 20. A gear 36, which is mounted upon the shaft 34 for rotation therewith, is in meshing engagement with the gear head 20a of the stepping motor 20 and a gear 38 carried by the shaft of a position transducer 40 (e.g., a resolver). The transducer 40 furnishes a feedback signal to the computer 16 which is representative of metering valve position. The metering valve, per se, comprises an upper plate 22a and a lower plate 22b, the latter plate being universally mounted upon a spherical section 34a of shaft 34 in order to accommodate any slope in the cavity wall against which it slides. The upper plate 22a is fixedly mounted upon the upper end of the shaft 34 so as to be rotatable thereby. Interposed between the upper plate 22a and the lower plate 22b is a compression spring 22c, the function of which is to maintain the lower surface of the lower plate 22b in firm engagement with the wall of the cavity 32 surrounding the metering opening 30. A pin 22d extending between the plates drivingly interconnects the plates for movement in unison. The upper surface of plate 22a incorporates a detent 22e which is engaged during manual metering valve operation, as is more fully set forth hereinafter.

The housing 12 is provided with a main fuel supply conduit, which is only partially shown, through which the fuel flows, the fuel being supplied by a suitable pump (not shown). The main fuel supply conduit comprises segments 42, 44, 46, and 47. Segment 42 delivers fuel to the cavity 32 from where it enters the metering orifice and passes thence into segment 44. A metering head regulator (not shown) is adapted to hold a constant pressure differential across the metering orifice 30 whereby flow therethrough will be essentially a function of the area thereof, and hence, valve position. Fuel flow from segment 44 enters segment 46 after traversing a flow limiting valve 48 which functions only during manual operation of the fuel metering valve 22 when engine overspeed or overtemperature conditions are engendered as hereinafter explained. Flow proceeds from segment 46 past a pressurizing valve 49 and into segment 47 which is in fluid communication with the burner nozzles of the engine.

The structure employed to interconnect the metering valve 22 and the lever member 24 for manual fuel metering is equivalent to the various arrangements depicted in U.S. Pat. No. 4,077,203 and admits of many variations. A shaft 50 is mounted for rotation in the housing 12 and carries a gear 52 in meshing engagement with the gear 27. The shaft comprises a depending leg 54 to which is pivotally connected an arm 56 having an enlarged end 58 adapted to be received in the detent 22e. A solenoid 60 is mounted in the housing adjacent the leg 54 of the shaft 50 such that the end of its plunger 62 is pivotally connected to an intermediate portion of the arm 56. By selecting manual control on a switch 53 (see FIG. 2), the solenoid 60 will be deenergized, thereby causing a spring (not shown) in the solenoid to drive the plunger downwardly whereby the arm 56 will engage the detent 22e. With the metering valve 22 engaged in this manner, movements of the lever member 24 are mechanically transmitted to the metering valve 22.

During manual operation of the metering valve 22, immoderate lever member movements may occasion engine overspeeds or overtemperature conditions due to overfueling. However, flow limiting valve 48 will be positioned to forestall such detrimental overfueling by limiting fuel flow in accordance with the magnitude of the overspeed or overtemperature error. The details of the protective features of the invention be hereinafter described with reference to FIGS. 1 and 2.

The flow limiting valve 48 is mounted in the housing 12 downstream of the main fuel metering valve for axial sliding therein between the normal illustrated position and a seated (extreme leftward) position in which it abuts annular valve seat 64, wherein the flow in the main fuel supply conduit being delivered to the engine is reduced to a minimum. A minimum flow may always proceed around the valve 48 by virtue of conduits 66 and 68 which function to fluidly interconnect segment 46 with cavity 70 which is at pressure Pf, the pressure upstream of the metering valve 22. A screw 72 is provided to form a variable restriction between the conduits 66 and 68 for adjustment of the minimum fuel flow rate.

An actuation cylinder, generally shown at 74, is disposed in the housing and connected to the flow limiting valve 48 for the positioning thereof. The actuation cylinder comprises a cylindrical cavity 76 in the housing 12 in which is mounted a piston 78 and a compression spring 77 coiled about the stem of the valve 48 which is connected to the piston 78. The spring 77 is seated against the left face of the piston and the right wall of the cavity 76 such that the piston 78, and hence valve 48, is urged rightwardly, thereby to maintain valve 48 in engagement with another valve seat 80. Piston 78 divides the cavity 76 into two chambers, to wit, chamber 82 and 84. Chamber 82 is exposed to boost pressure Pb (i.e., the pressure at the inlet of the main fuel pump which is not shown) and chamber 84 is referenced to a variable pressure Pc which is equal to boost pressure during normal fuel control operation and also during manual fuel metering when no overspeed or overtemperature conditions are sensed. When valve 48 is limiting fuel flow, the pressure Pc in chamber 84 will be somewhere between boost pressure Pb and the pressure delivered by the main fuel pump Pf which is that pressure upstream of the metering valve 22 in conduit 42.

With continued reference to FIG. 1, a valve 86 comprises a ball 88 which seats as illustrated to choke the exit orifice of a conduit 90 when the solenoid 92 (which operates the valve) is de-energized, thereby opening a path of fluid communication between the chamber 84 of the actuating cylinder 74 and the relatively low boost pressure Pb. Communication with boost pressure Pb, is via conduit 94, its exit orifice 96 and conduit 98. Conversely, an energization of the solenoid 92 causes the ball 88 to seat so as to choke orifice 96, thereby providing communication between the chamber 84 and the relatively high fuel pressure Pf via conduit 90, its exit orifice and conduit 98. As the solenoid operated valve is rapidly pulsed (e.g., 40-60 Hz.), the pressure Pc in the chamber 84 will assume a value which is a function of the duty cycle (i.e., the ratio of the time that current is supplied to the solenoid to the period). Utilizing a pulsed solenoid operated valve is an old and well-known method of modulating a pressure and is more completely discussed in U.S. Pat. Nos. 3,430,536, 3,516,331, 3,521,535 and 3,763,373.

The redundant analog control circuit which applies pulses to the solenoid 92 is depicted in FIG. 2. Overspeed and overtemperature error signals are directed to a lowest value gate 100 which permits the greater (i.e., the most negative) of the error signals to be directed to a variable duty cycle oscillator 102. The variable duty cycle oscillator is a fixed frequency (e.g., 50 Hz.) device which generates a square wave voltage form having a certain voltage V for a portion of each cycle and zero voltage for the remaining portion of each cycle. The respective fractions of a cycle during which the output of the oscillator is V and zero are proportional to the magnitude of the signal from the lowest value gate 100. The square wave voltage form from the oscillator is applied to a solenoid driver 104 (e.g., a Darlington transistor) which is connected to solenoid for directing current therethrough. In order to apprise an operator of an overspeed or overtemperature condition, a cockpit indicator 106 is provided. The indicator 106 may have as its input the output of the lowest value gate 100 or another suitable signal.

With the electronic computer 16 operating normally, minor overspeed and overtemperature conditions are handled by the computer through its commanded fuel flow signal. Although the redundant control circuit 18 is operational during this period, only an error signal beyond a predetermined magnitude will be directed to the gate 100. Hence, during this period, the output of the oscillator 102 is zero volts, thereby causing chamber 84 to be reference to boost pressure Pb. Only a gross computer malfunction will result error signals being applied to the gate 100. Such signals will, as in manual operation, cause the solenoid 92 to be pulsed and the valve 48 accordingly positioned.

When manual control is selected on switch 53, the metering valve may be directly positioned by movements of lever 24. Such a switchover may be mandated by discernable computer malfunction or the requirements of operator training in the manual operation of the fuel control 10. Should an overspeed or overtemperature condition arise by virtue of improvident operator action, the error signal passed to the oscillator 102 will produce a pulsing of the solenoid so as to raise the pressure Pc in chamber 84, thereby causing leftward movement of piston 78, and hence, valve 48. Leftward movement of valve 48 reduces fuel flow so as to alleviate the overspeed or overtemperature condition. When the error signal diminishes in value the duty cycle of the pulsing will accordingly decrease whereby the pressure Pc will be reduced. Upon cessation of the error signal valve 48 will, of course, move rightwardly into its normal position as illustrated.

Obviously, many modifications and variations are possible in view of the above teachings without departing from the scope and spirit of the invention as defined in the subjoined claims:

We claim:

1. In a fuel control for a gas turbine engine of the type having: a housing with a main fuel supply conduit; a metering valve for controlling fuel flow in the conduit; a valve driving mechanism operatively connected to the metering valve for positioning the metering valve in accordance with a control signal applied thereto; an electronic computer, responsive to a plurality of engine parameters, operatively connected to the valve driving mechanism for applying the control signal thereto; a lever member for setting a requested speed; a transducer operatively connected to the lever member for directing a requested speed signal to the computer; a drive shaft operatively connected to the lever member for rotation in response to lever member displacements; engagement means to drivingly interconnect the metering valve and the drive shaft such that rotation of the drive shaft positions the metering valve; the improvement comprising:

a flow limiting valve mounted in the main fuel supply conduit downstream of the main fuel metering valve;

an actuation cylinder disposed in the housing and connected to the flow limiting valve for the positioning thereof;

a solenoid operated valve fluidly connected to the actuation cylinder to alternately communicate high and low fuel pressure in the housing for modulating the pressure therein; and a solenoid control circuit adapted to sense engine overspeed and overtemperature error signals for applying pulses having a duty cycle commensurate with the magnitude of the error signals to the solenoid operated valve such that the actuation cylinder positions the flow limiting valve to restrict fuel flow.

2. The improvement of claim 1, further comprising: means to direct boost pressure and the pressure upstream of the metering valve to the solenoid operated valve.

3. The improvement of claim 1, further comprising: adjustable means to provide for a minimum flow around the flow limiting valve.

4. The improvement of claim 1, wherein the solenoid control circuit comprises:

a lowest value gate for receiving the overspeed and overtemperature error signals;

a variable duty cycle oscillator adapted to receive the output error signal of the lowest value gate and generate a square wave voltage form; and a solenoid driver adapted to receive the square wave voltage form from the variable duty cycle oscillator and apply pulses to the solenoid operated valve.

* * * * *